United States Patent
Young

(10) Patent No.: US 8,995,008 B2
(45) Date of Patent: Mar. 31, 2015

(54) SYSTEM AND METHOD FOR ADJUSTING AN IMAGE TO BE PRINTED ON A MEDIUM THAT WILL BE EMBOSSED

(71) Applicant: Kenneth Young, Foster City, CA (US)

(72) Inventor: Kenneth Young, Foster City, CA (US)

(73) Assignee: Konica Minolta Laboratory U.S.A., San Mateo, CA (US)

( * ) Notice: Subject to any disclaimer, the term of this patent is extended or adjusted under 35 U.S.C. 154(b) by 0 days.

(21) Appl. No.: 13/800,324

(22) Filed: Mar. 13, 2013

(65) Prior Publication Data

US 2014/0268188 A1  Sep. 18, 2014

(51) Int. Cl.
*G06K 15/10* (2006.01)
*G06K 15/02* (2006.01)

(52) U.S. Cl.
CPC .................... *G06K 15/021* (2013.01)
USPC ............... 358/1.5; 156/221; 347/14; 358/1.1; 358/1.2

(58) Field of Classification Search
USPC .................. 358/1.5, 1.1, 1.14, 1.15, 1.2, 1.9; 101/248, 45; 156/221, 358; 162/134; 264/219, 40.1, 40.5; 273/153 R; 33/556; 345/156, 207, 472, 625, 629; 347/14; 356/601, 610; 382/154; 40/625; 400/76; 53/396
See application file for complete search history.

(56) References Cited

U.S. PATENT DOCUMENTS

| | | | |
|---|---|---|---|
| 6,515,667 B1 * | 2/2003 | Haneda et al. | 345/472 |
| 7,583,391 B2 * | 9/2009 | Lu | 356/601 |
| 2002/0023325 A1 * | 2/2002 | Fant et al. | 27/2 |
| 2003/0086603 A1 * | 5/2003 | Davidson et al. | 382/154 |
| 2006/0066880 A1 * | 3/2006 | Miyazaki et al. | 358/1.1 |
| 2007/0241473 A1 * | 10/2007 | Brossman | 264/40.1 |
| 2009/0030648 A1 * | 1/2009 | Hunter et al. | 702/152 |
| 2009/0229773 A1 * | 9/2009 | Appleford et al. | 162/134 |
| 2009/0321002 A1 * | 12/2009 | Spengler | 156/221 |
| 2010/0102476 A1 * | 4/2010 | Higgins | 264/219 |
| 2010/0250178 A1 * | 9/2010 | Noda et al. | 702/95 |
| 2011/0001983 A1 * | 1/2011 | Becker et al. | 356/610 |
| 2011/0050724 A1 | 3/2011 | Luu et al. | |
| 2011/0075200 A1 * | 3/2011 | Goldwater et al. | 358/1.15 |
| 2012/0200867 A1 * | 8/2012 | Fujita et al. | 358/1.9 |
| 2013/0027458 A1 * | 1/2013 | Sirringhaus et al. | 347/14 |
| 2013/0229396 A1 * | 9/2013 | Huebner | 345/207 |
| 2013/0280498 A1 * | 10/2013 | Horiuchi et al. | 428/195.1 |

* cited by examiner

*Primary Examiner* — David S Cammack

(74) *Attorney, Agent, or Firm* — Buchanan Ingersoll & Rooney PC

(57) ABSTRACT

A system adjusts an original image for printing on a location on a medium that will be bossed after printing the adjusted image on the medium. The system comprises an interface for receiving information concerning a bossment to be implemented on the medium after printing the adjusted image on the medium; and an adjustor that makes an adjustment to the received image based on the information received by the interface. A method for operating the system is also disclosed.

24 Claims, 10 Drawing Sheets

In some situations, after an image is printed on a medium, such as paper or paper board, the medium is embossed, i.e., depressions formed therein, or debossed, i.e., projections formed thereon, to impart texture to the medium. As used herein, the term bossment includes embossment or a debossment that has been imparted to the medium. Some forms of bossment result in a contraction of the overall width of the medium because the sidewalls of the bossment take up some of the former width of the paper. Other forms of bossment do not change the overall width of the medium because the medium is actually stretched slightly in the areas of the bossment. Printing on a medium that has a bossment thereon presents challenges. When text is printed in the bossed area, it will give the appearance of text being too close to each other or too far from each other depending on whether the medium has been stretched or contracted, as explained above. When the medium has been contracted, the letters of text of a printed image may appear too close to one another. Furthermore, the individual letters may appear narrower than intended where some of the letters are formed on portions of the medium that include side walls of the bossment, and are thus not readily visible. In some cases, entire portions of an image, or letters in the image, may be lost as a result of the fact that the portion of the medium on which they were printed now constitutes the sidewalls of the bossment, and are thus not readily visible.

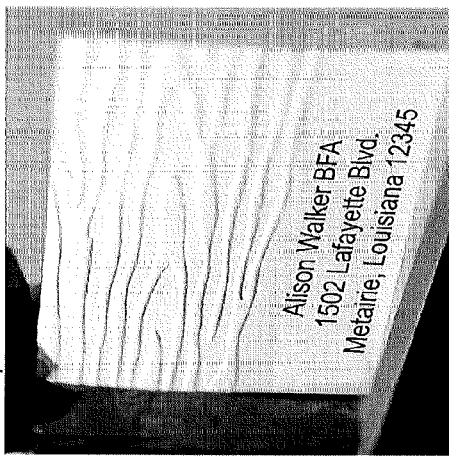

FIG. 16

SYSTEM AND METHOD FOR ADJUSTING AN IMAGE TO BE PRINTED ON A MEDIUM THAT WILL BE EMBOSSED

FIELD OF THE INVENTION

This disclosure relates to a system and method for adjusting an image that is to be printed on a medium, such as paper or paper board, that will be embossed after printing. The disclosure also relates to a nontransitory computer readable medium encoded with a program for causing a system to adjust an image that is to be printed on a medium, such as paper or paper board, that will be embossed after printing.

RELATED ART

In some situations, after an image is printed on a medium, such as paper or paper board, the medium is embossed, i.e., depressions formed therein, or debossed, i.e., projections formed thereon, to impart texture to the medium. As used herein, the term bossment includes generically either an embossment or a debossment that has been imparted to the medium. Some forms of bossment result in a contraction of the overall width of the medium because the sidewalls of the bossment take up some of the former width of the paper. Other forms of bossment do not change the overall width of the medium because the medium is actually stretched slightly in the areas of the bossment.

Printing on a medium that has a bossment thereon presents challenges. When text is printed in the bossed area, it will give the appearance of text being too close to each other or too far from each other depending on whether the medium has been stretched or contracted, as explained above. When the medium has been contracted, the letters of text of a printed image may appear too close to one another. Furthermore, the individual letters may appear narrower than intended where some of the letters are formed on portions of the medium that include side walls of the bossment, and are thus not readily visible. In some cases, entire portions of an image, or letters in the image, may be lost as a result of the fact that the portion of the medium on which they were printed now constitutes the sidewalls of the bossment, and are thus not readily visible.

On the other hand, where the medium has been stretched as a result of the bossment, the portions of the image that were formed on the portions of the medium that were stretched may themselves appear stretched or distorted. Such stretching may also reduce the sharpness or density of those portions of the image.

Prior to the present invention, in order to resolve these issues, a user had to manually adjust the text to be larger or smaller, and/or include wider or narrower character spacing for those areas where embossing occurs.

SUMMARY

A system is proposed for adjusting an original image to be printed on a location on a medium that will be bossed after printing the adjusted image on the medium. The system comprises:

an interface for receiving information concerning a bossment to be implemented on the medium after printing the adjusted image on the medium; and an adjustor that makes an adjustment to the received image based on the information received by the interface.

According to one embodiment, the system scans a bossed medium to determine the information.

According to one embodiment, the system scans a bossed medium at two different light settings to determine the information.

According to one embodiment, the system uses a laser scanner to determine the information.

According to one embodiment, the system uses mechanical feelers to determine the information.

According to one embodiment, the interface includes a user interface for inputting one or more of:
 the portion of the medium that will be bossed;
 whether the bossment will be an embossment;
 whether the bossment will be a debossment;
 whether the bossment will cause overall dimensions of the medium to be reduced;
 whether the bossment will stretch the medium;
 whether the bossment includes a pattern extending in a vertical direction; and
 whether the bossment includes a pattern extending in a horizontal direction.

According to one embodiment, adjustment includes one or more of:
 enlarging a width of a font in the original image;
 reducing a width of a font in the original image;
 increasing a density of the original image in certain locations;
 decreasing a density of the original image in certain locations;
 adjusting a character spacing of text in the original image;
 reducing a size of the original image; and
 relocating the original image to a new location on the medium.

According to one embodiment, the system further comprises a display for displaying the adjusted image prior to printing the adjusted image on the medium; an input for inputting alterations to the adjusted image after review the displayed adjusted image; and/or an image forming unit for forming the adjusted image on the medium.

A method is proposed for adjusting an original image to be printed on a location on a medium that will be bossed after printing the adjusted image on the medium. The method comprises:

receiving information concerning a bossment to be implemented on the medium after printing the adjusted image on the medium; and making an adjustment to the received image based on the information received by the interface.

According to one embodiment, the interface scans a bossed medium to determine the information.

According to one embodiment, the interface scans a bossed medium at two different light settings to determine the information.

According to one embodiment, the interface uses a laser scanner to determine the information.

According to one embodiment, the interface uses mechanical feelers to determine the information.

According to one embodiment, the interface includes a user interface for inputting one or more of:
 a portion of the medium that will be bossed;
 whether the bossment will be an embossment;
 whether the bossment will be a debossment;
 whether the bossment will cause overall dimensions of the medium to be reduced;
 whether the bossment will stretch the medium;
 whether the bossment includes a pattern extending in a vertical direction; and
 whether the bossment includes a pattern extending in a horizontal direction.

According to one embodiment, the adjustment includes one or more of:
  enlarging a width of a font in the original image;
  reducing a width of a font in the original image;
  increasing a density of the original image in certain locations;
  decreasing a density of the original image in certain locations;
  adjusting a character spacing of text in the original image;
  reducing a size of the original image; and
  relocating the original image to a new location on the medium.

According to one embodiment, the adjusted image is displayed prior to printing the adjusted image on the medium.

According to one embodiment, alterations are input to the adjusted image after reviewing the displayed adjusted image.

According to one embodiment, the adjusted image is formed on the medium.

Also proposed is a nontransitory computer readable medium encoded with a program for executing a method for adjusting an original image to be printed on a location on a medium that will be bossed after printing the adjusted image on the medium, the method comprising:
  receiving information concerning a bossment to be implemented on the medium after printing the adjusted image on the medium; and
  making an adjustment to the received image based on the information received by the interface.

BRIEF DESCRIPTION OF THE DRAWINGS

FIG. 16 is an example where text has been wrapped around an image.

DETAILED DESCRIPTION OF THE PREFERRED EMBODIMENTS

In order to minimize the aforementioned issues concerning the distortion of a printed image when the medium on which the image is printed is embossed or debossed, an image processing apparatus can be used to alter or adjust the image in order to accommodate the embossments or debossments that are subsequently imparted to the medium.

The image processing can take place in a multi-functional peripheral (MFP) device 10 that includes software for such image processing. MFPs may have a variety of functions, such as copying, network printing, scanning, faxing, and Transmission Control Protocol/Internet Protocol (TCP/IP) communication. Alternatively, the image processing can take place in a client computer 20 that is connected to a printer 30 or an MFP 10 which prints the image. The MFP 10, the client computer 20, and the printer 30 may be connected by a network 40, such as a local area network (LAN).

One of the first steps is to determine what types of embossments or debossments will be imparted to the printed medium after the printing takes place, and where the bossments will be located. For example, in some cases, the entire medium will be bossed, whereas in others, only certain portions of the paper will be bossed. There are a number of ways in which the bossment data can be collected and input to the MFP 10, ranging from fully automated to manual data entry methods.

Figure 1:
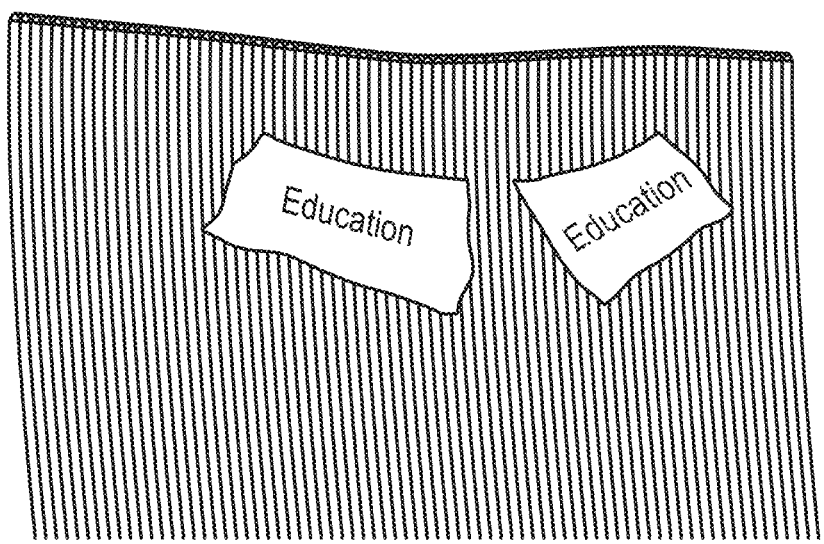
FIG. 1 is a view of images printed on an embossed medium, wherein one portion of the image has not been adjusted according to an embodiment of the present invention and another portion of the image has been adjusted according to an embodiment of the present invention.
Figure 2:
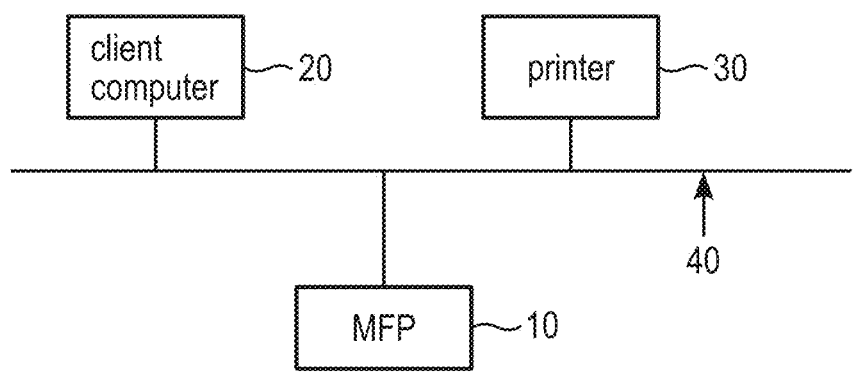
FIG. 2 illustrates a collection of devices that can be used in implementing an embodiment of the present invention.
Figure 3:
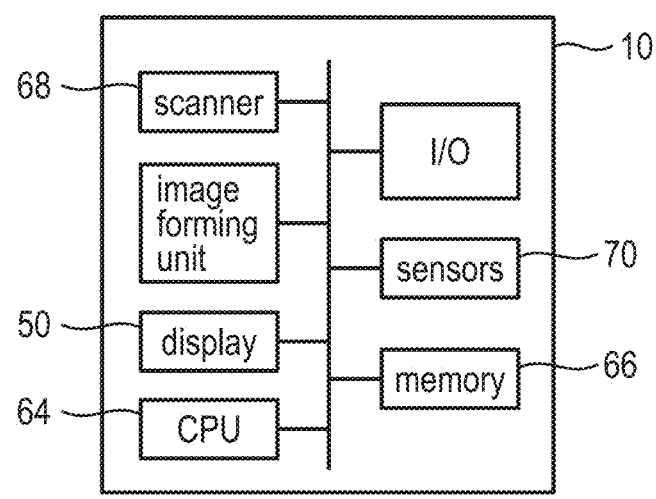
FIG. 3 is a schematic diagram of basic portions of the MFP according to an embodiment of the invention.
Figure 4:
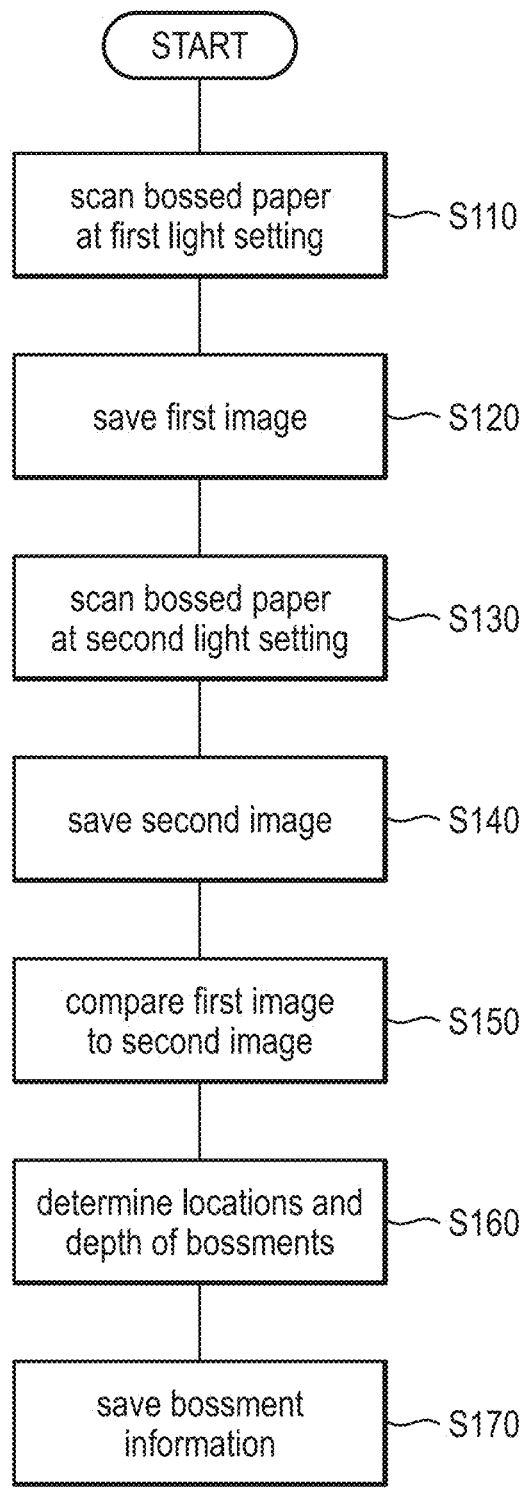
FIG. 4 is a flow chart show a simplified process used according to one embodiment of the invention.

According to one embodiment illustrated in FIGS. 3 and 4, the scanner 68 of the MFP 10 can be used to determine certain data concerning the bossments. For example, the user will load a sample, unprinted, embossed or debossed medium, such as paper, onto the scanner 68 of the MFP. The scanner 68 will scan the embossed/debossed medium at a first light setting (Step S110) and save the image as the first image (Step S120). The scanner 68 will then scan the embossed/debossed medium at a second light setting (Step S130) and save the image as the second image (Step S140). The system will then compare the first and second saved images (Step S150). Any differences in the images can then be attributed to an embossment or debossment on the medium. The system will then use the comparison to determine the locations and depths/heights of any bossments (Step S160). The determined bossment information is then saved (Step S170) and can be used to adjust image data for subsequent printing.

Another method of detecting the emboss/deboss locations is disclosed in U.S. Patent Publication No. US 2011/0050724 A1, the contents of which are incorporated herein by reference. However, the present invention is not limited to the methods disclosed therein.

Yet another system for detecting bossments is the Cross-Check™ Laser Profile Sensor by Bytewise Measurement Systems. See: http://www.prweb.com/releases/CrossCheck_Sensors/Profile_Measurement/prweb3502334.htm for further information.

According to yet another system, a sensor 70, such as metal fingers, may be added to the MFP 10 and used to measure the embossment/debossment depth or height as the metal fingers run across the medium.

The present invention is not limited to any particular method of determining the locations and depths/heights of the bossments. Other forms of technology can be used, as well as various combinations of the above-mentioned systems.

Figure 5:
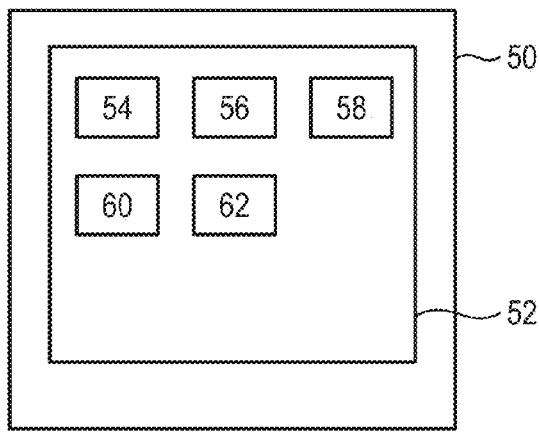
FIG. 5 illustrates a user interface according to an embodiment of the present invention.

The present invention further encompasses an alternative embodiment where bossment information can be manually input to the system, e.g., through a display 50 on either the MFP 10 or the client computer 20. In such an embodiment, the user will determine one or more criteria concerning the embossments or debossments, and will input such criteria into a user interface 52 on either the MFP 10 or the client computer 20. FIG. 5 illustrates a display 50 incorporating such a user interface 52. In one embodiment, the display 50 includes input devices 54, 56, 58, 60, 62, 64 wherein the user can enter the criteria concerning the embossments or debossments.

Figure 6:
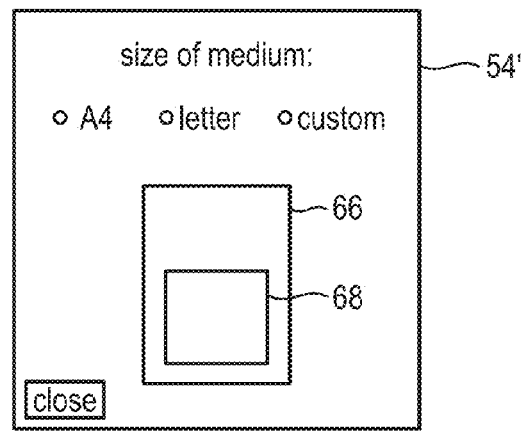
FIGS. 6 through 10 are examples of input devices that are used with various embodiments of the present invention.

For example, using one input device 54, the user can define the portion of the medium that will be bossed. As illustrated in FIG. 6, upon clicking on input device 54, a dialogue box 54' appears. In the dialogue box 54', the user is able to input the size of the medium to be printed. After inputting the medium size, a schematic image 66 of the medium appears. Using a mouse or other conventional pointer tool, the user can draw in a boundary 68 of the portion of the medium that will be bossed.

Figure 7:
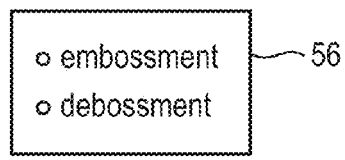

In another input device 56, illustrated schematically in FIG. 7, the user can indicate whether the bossment will be an embossment or a debossment.

Figure 8:
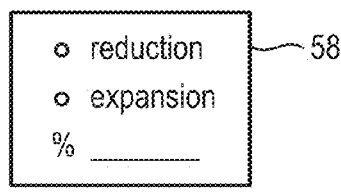

Another input device 58, illustrated schematically in FIG. 8, enables a user to indicate whether the bossment will cause overall dimensions of the medium to be reduced or whether the bossment will stretch the medium at the location of the bossment. The input device further includes a place where the user can input the anticipated percentage of stretching or contraction.

Figure 9:
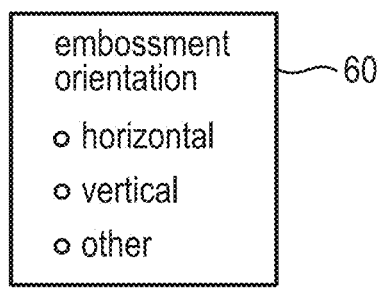

Another input device 60 allows a user to input whether the bossment includes a pattern extending in a vertical direction or in a horizontal direction. If the bossment has no specific orientation, or is oriented in a diagonal direction, the user can input "other". See FIG. 9.

Figure 10:
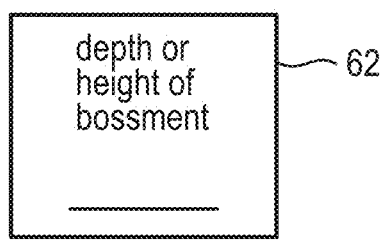

FIG. 10 illustrates another input device 62 that enables a user to input an approximate depth of an embossment or a height of a debossment.

Figure 11:
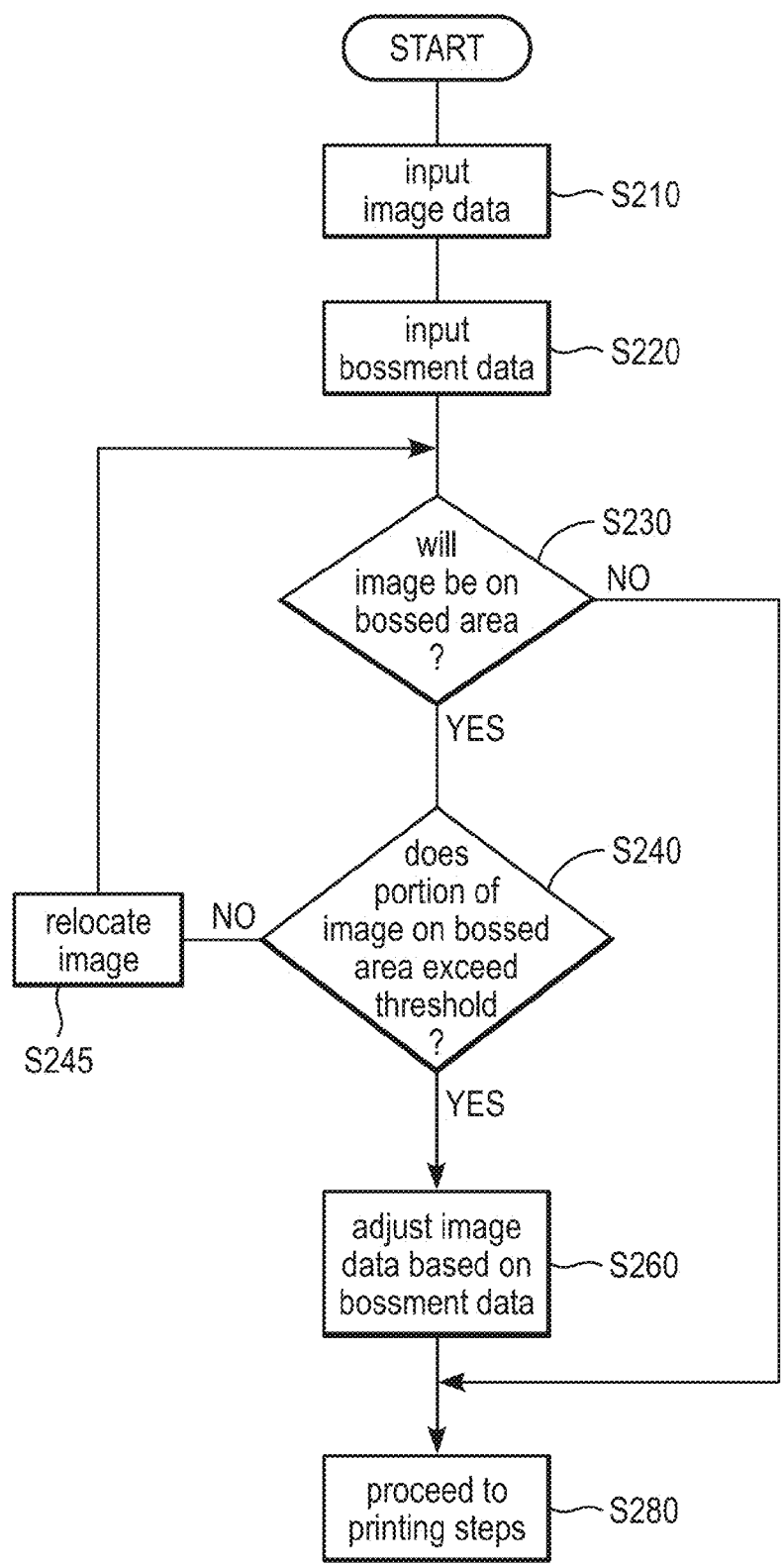
FIG. 11 is a flowchart showing a process used in an embodiment of the present invention.

According to one embodiment, illustrated in FIG. 11, data of the image to be printed is input (Step S210). Then, the data determined as a result of the scanning and/or measuring operations of the MFP 10 (which are discussed above) are input (Step S220). All of the data is then sent to a processor, such as a CPU 64 for analysis to determine what adjustments, if any, should be made to an image that will be printed on a medium in order to accommodate the subsequent bossing of the medium (Step S220). In one embodiment, the analysis is performed by a printer driver that is stored in a memory 66.

Next, the system then determines if the image will be printed on a bossed area (Step S230). If NO, the process proceeds to printing (Step S280). If YES, the image will be on a bossed area, the system determines whether the portion of the image that will be on a bossed area exceeds a predetermined threshold. The threshold can be set according to specific applications. In one embodiment, the threshold is 10%, 15%, or 20%.

If the portion of the image that will be on an embossed area is less than the preset threshold, the process proceeds to Step S245, wherein the image may be relocated. Relocation of the image can be done automatically by determining if there is a sufficient adjacent area in which the image could fit. If so, the image could be automatically moved into that area. Alternatively, the system could be set up so that the image could be manually moved by input from a user.

In such a case, other than the relocation, the actual image to be printed will not be adjusted.

Alternatively, if the image is already located in an area that will be primarily free from embossment/debossment, but overlaps slightly on an area to be embossed or debossed, the system may determine to simply reduce in size the overall image such that the image will no longer be in the area overlapping with the area to be embossed or debossed.

If the system determines that the portion of the image that will be on a bossed area exceeds a predetermined threshold, YES at S240, the system then determines how to adjust the image so that any distortion caused by the embossment or debossment will be compensated.

In this automated embodiment, the adjustment of the image is based on the location of the bossment and the determined height or depth of the bossment (Step S260). In this embodiment, the adjustment of the image can be done in any number of ways. Specifically, based on the height or depth of the bossment, the line width of any fonts in the image at bossment locations will be increased in proportion to the height or depth of the bossment. In addition, spacing of font characters in the embossed regions will also be adjusted in proportion to the height or width of the bossments so that the printing—after bossment of the paper—will appear as intended. Images in portions of the paper that will not be bossed will not be adjusted. Accordingly, if a line of text extends across both bossed and nonbossed areas, only the portion of the line of text that is in the bossed area will be adjusted. The adjustments will only affect the portion of the image that is in the bossed area, so that the layout of the remaining characters on the nonbossed area is not affected.

After adjustment at Step S260, the system then proceeds to printing at Step S280.

Figure 12:
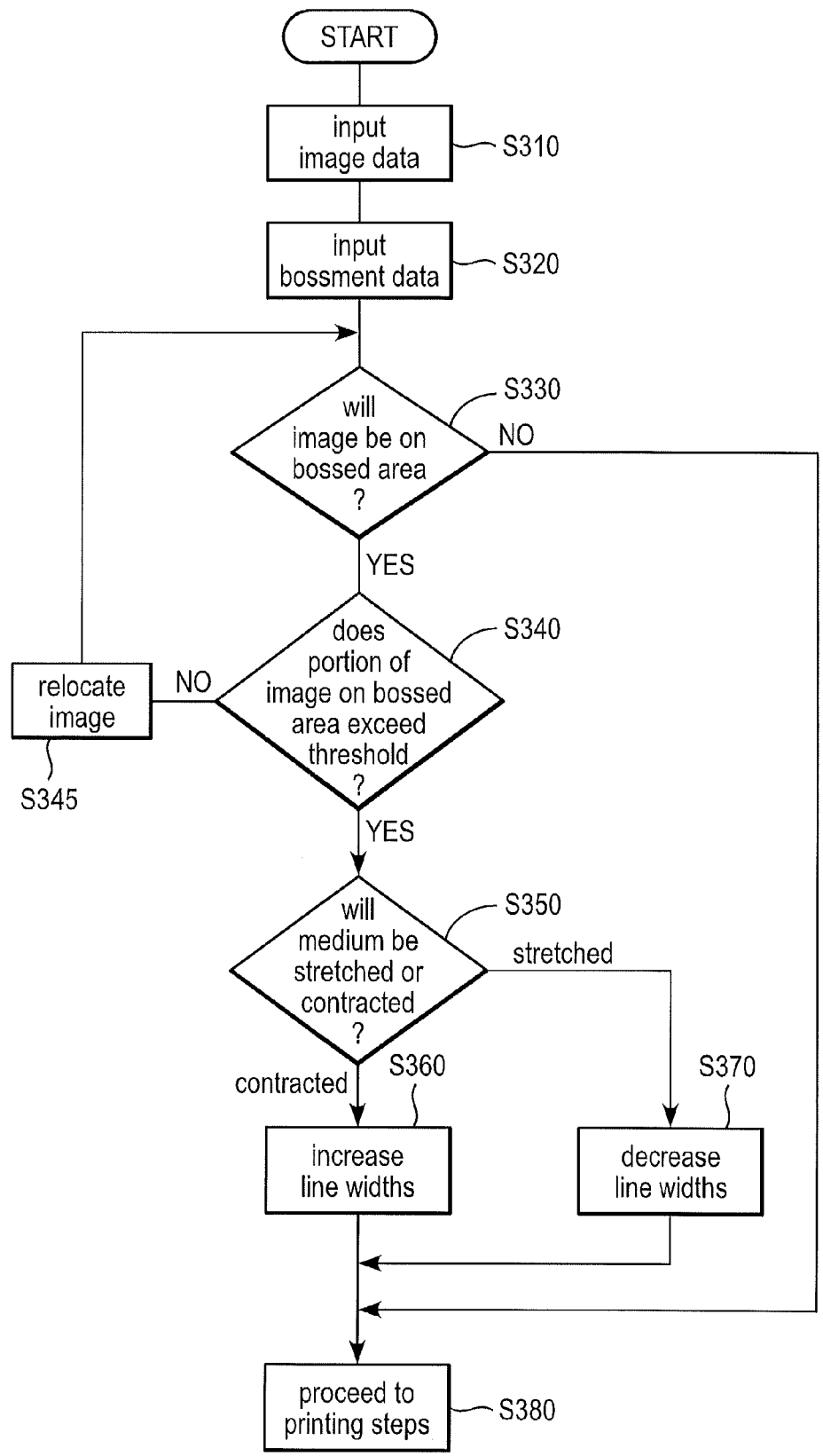
FIG. 12 is a flowchart showing a process used in another embodiment of the present invention.

According to a less automated embodiment, illustrated in FIG. 12, data of the image to be printed is input (Step S310). Then, data is input by the user into the display 50 (Step S320). All of the data is then sent to a processor, such as a CPU 64 for analysis to determine what adjustments, if any, should be made to an image that will be printed on a medium in order to accommodate the subsequent bossing of the medium (Step S320). In one embodiment, the analysis is performed by a printer driver that is stored in a memory 66.

Next, the system then determines if the image will be printed on a bossed area (Step S330). If NO, the process proceeds to printing (Step S380). If YES, the image will be on a bossed area, the system determines whether the portion of the image that will be on a bossed area exceeds a predetermined threshold. The threshold can be set according to specific applications. In one embodiment, the threshold is 10%, 15%, or 20%.

If the portion of the image that will be on an embossed area is less than the preset threshold, the process proceeds to Step S345, wherein the image may be relocated. Relocation of the image can be done automatically by determining if there is a sufficient adjacent area in which the image could fit. If so, the image could be automatically moved into that area. Alternatively, the system could be set up so that the image could be manually moved by input from a user.

In such a case, other than the relocation, the actual image to be printed will not be adjusted.

Alternatively, if the image is already located in an area that will be primarily free from embossment/debossment, but overlaps slightly on an area to be embossed or debossed, the system may determine to simply reduce in size the overall image such that the image will no longer be in the area overlapping with the area to be embossed or debossed.

If the system determines that the portion of the image that will be on a bossed area exceeds a predetermined threshold, YES at S340, the system then determines how to adjust the image so that any distortion caused by the embossment or debossment will be compensated.

If YES at S340, the system determines whether the bossment will cause the medium to be stretched or contracted (step S350) based on data entered at input device 56.

If the medium is to be contracted (YES at S340), the system adjusts the image to increase the line width of fonts in the concerned area so that when the medium is subsequently contracted by the bossing (i.e., either embossing or debossing) process, the fonts will similarly be contracted and will end up with the desired size line widths (Step S360).

If the medium is to be stretched, the system adjusts the image to decrease the line width of fonts in the concerned area so that when the medium is subsequently stretched by the bossing process, the fonts will similarly be contracted and will end up with the desired size line widths (Step S370).

The extent of increasing or decreasing the font line widths depends in part on either the depth or height of the bossment entered through input device 62 or on the percentage of reduction or expansion entered at input device 58, or some combination of both.

Figure 13:
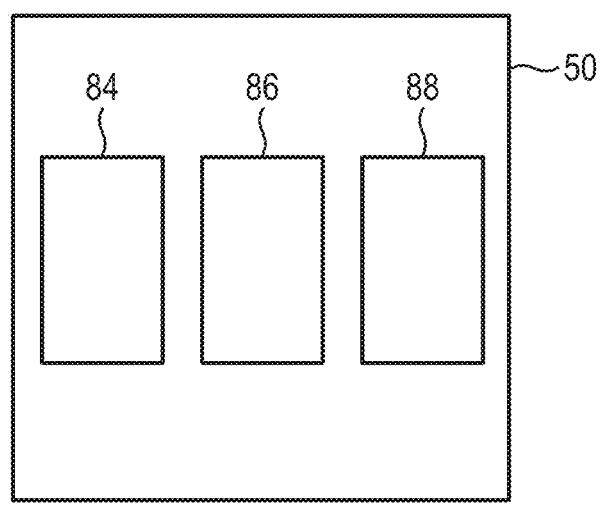
FIG. 13 is an exemplary embodiment of a preview feature that can be used according to one embodiment of the invention.

In another embodiment, the system includes a preview option. According to the preview option, the system displays on the display 50 various stages of the image. As illustrated in FIG. 13, in section 84 of a screen on the display 50, the originally input image is displayed. In a second section 86 of the display 50, the image, as adjusted by the adjusting system described herein, and before any bossments are made, is displayed. And, optionally, in a third section 88 of the display 50, the image is displayed as assumed it will appear in the medium after the bossment has been made.

If, after reviewing the images in sections 84, 86, and optionally 88, the user is not satisfied with the image, the user can adjust the image by inputting data through the aforementioned user interface 52, or changing data previously input, until the user is satisfied with the resulting image.

Figure 14:
FIG. 14 is an example of a use of an embodiment of the invention, wherein an image may be relocated.

In the event that the image is to be relocated, such as in a case illustrated in FIG. 14, there are a number of options available to the user. For example, the user can move the image above the emboss/deboss area; move the image below the emboss/deboss area; move the image above and below the emboss/deboss area. See FIG. 15. In the event that the image is text, the system can wrap the text around the emboss/deboss area as illustrated in FIG. 16.

Figure 15:
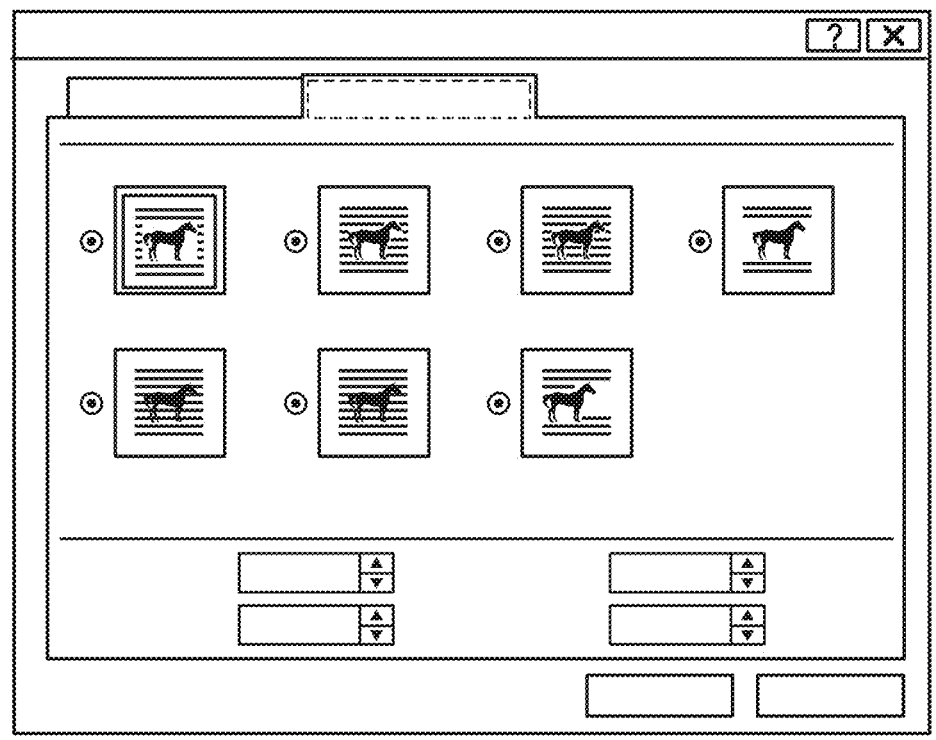
FIG. 15 is a schematic view of a user interface for relocating an image according to one embodiment of the invention.

The method of wrapping "around" the embossed/debossed area can be similar to how WORD® processing systems process the text around an image. FIG. 15 shows one input device that can be used to specify how to move or wrap text about an embossed area.

After the system has made the modifications to the image, the image is then printed on the medium that will subsequently be embossed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. The present invention includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language "present invention" or "invention" should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A system for adjusting an original image for printing on a location on a medium that will be bossed after printing the adjusted image on the medium, the system comprising:
    an interface for receiving information concerning a bossment to be implemented on the medium after printing the adjusted image on the medium, the medium having a bossed area and a non-bossed area upon implementation of the bossment; and
    an adjuster that makes an adjustment to the received image based on the information received by the interface, wherein the adjuster is configured to reduce a size of the original image in its entirety to avoid the bossed area and/or relocate the original image to a new location on the medium to avoid the bossed area.

2. The system of claim 1, wherein the interface scans a bossed medium to determine the information.

3. The system of claim 2, wherein the interface scans a bossed medium at two different light settings to determine the information.

4. The system of claim 1, wherein the interface uses a laser scanner to determine the information.

5. The system of claim 1, wherein the interface uses mechanical feelers to determine the information.

6. The system of claim 1, wherein the interface includes a user interface for inputting one or more of:
    a portion of the medium that will be bossed;
    whether the bossment will be an embossment;
    whether the bossment will be a debossment;
    whether the bossment will cause overall dimensions of the medium to be reduced;
    whether the bossment will stretch the medium;
    whether the bossment includes a pattern extending in a vertical direction; and
    whether the bossment includes a pattern extending in a horizontal direction.

7. The system of claim 1, wherein the adjustment further includes one or more of:
    reducing a width of a font in the original image;
    decreasing a density of the original image in certain locations; and
    adjusting a character spacing of text in the original image.

8. The system of claim 1, further comprising a display for displaying the adjusted image prior to printing the adjusted image on the medium.

9. The system of claim 8, further comprising an input for inputting alterations to the adjusted image after reviewing the displayed adjusted image.

10. The system of claim 1, further comprising an image forming unit for forming the adjusted image on the medium.

11. A method for adjusting an original image to be printed on a location on a medium that will be bossed after printing the adjusted image on the medium, the method comprising:
    receiving information concerning a bossment to be implemented on the medium after printing the adjusted image on the medium, the medium having a bossed area and a non-bossed area upon implementation of the bossment; and making an adjustment to the received image based on the information received by the interface, wherein the adjustment is reducing a size of the original image in its entirety to avoid the bossed area and/or relocating the original image to a new location on the medium to avoid the bossed area.

12. The method of claim 11, wherein the interface scans a bossed medium to determine the information.

13. The method of claim 11, wherein the interface scans a bossed medium at two different light settings to determine the information.

14. The method of claim 11, wherein the interface uses a laser scanner to determine the information.

15. The method of claim 11, wherein the interface uses mechanical feelers to determine the information.

16. The method of claim 11, wherein the interface includes a user interface for inputting one or more of:
   a portion of the medium that will be bossed;
   whether the bossment will be an embossment;
   whether the bossment will be a debossment;
   whether the bossment will cause overall dimensions of the medium to be reduced;
   whether the bossment will stretch the medium;
   whether the bossment includes a pattern extending in a vertical direction; and
   whether the bossment includes a pattern extending in a horizontal direction.

17. The method of claim 11, wherein the adjustment further includes one or more of:
   reducing a width of a font in the original image;
   decreasing a density of the original image in certain locations; and
   adjusting a character spacing of text in the original image.

18. The method of claim 11, further comprising displaying the adjusted image prior to printing the adjusted image on the medium.

19. The method of claim 18, further comprising inputting alterations to the adjusted image after reviewing the displayed adjusted image.

20. The method of claim 11, further comprising forming the adjusted image on the medium.

21. A nontransitory computer readable medium encoded with a program for executing a method for adjusting an original image to be printed on a location on a medium that will be bossed after printing the adjusted image on the medium, the method comprising:
   receiving information concerning a bossment to be implemented on the medium after printing the adjusted image on the medium, the medium having a bossed area and a non-bossed area upon implementation of the bossment; and
   making an adjustment to the received image based on the information received by the interface, wherein the adjustment is reducing a size of the original image in its entirety to avoid the bossed area and/or relocating the original image to a new location on the medium to avoid the bossed area.

22. The nontransitory computer readable medium of claim 21, wherein the interface scans a bossed medium at two different light settings to determine the information.

23. The nontransitory computer readable medium of claim 21, wherein the interface uses a laser scanner to determine the information.

24. The nontransitory computer readable medium of claim 21, wherein the interface uses mechanical feelers to determine the information.

* * * * *